(12) United States Patent
Iijima

(10) Patent No.: US 10,396,653 B2
(45) Date of Patent: Aug. 27, 2019

(54) DC-DC CONVERTER, SWITCHING IC, AND INDUCTOR DEVICE

(71) Applicant: Murata Manufacturing Co., Ltd., Nagaokakyo-shi, Kyoto-fu (JP)

(72) Inventor: Koichiro Iijima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 44 days.

(21) Appl. No.: 15/820,550

(22) Filed: Nov. 22, 2017

(65) Prior Publication Data

US 2018/0097438 A1 Apr. 5, 2018

Related U.S. Application Data

(63) Continuation of application No. PCT/JP2016/064862, filed on May 19, 2016.

(30) Foreign Application Priority Data

May 29, 2015 (JP) .................. 2015-110028

(51) Int. Cl.
*H02M 1/14* (2006.01)
*H02M 1/15* (2006.01)
(Continued)

(52) U.S. Cl.
CPC ............ *H02M 1/14* (2013.01); *H02M 1/15* (2013.01); *H02M 3/155* (2013.01); *H02M 3/158* (2013.01); *H02M 2001/0032* (2013.01)

(58) Field of Classification Search
CPC ... H02M 2001/0032; H02M 1/14; H02M 1/15
See application file for complete search history.

(56) References Cited

U.S. PATENT DOCUMENTS

| 5,451,853 A * | 9/1995 | Itoh ..................... H02P 1/44 |
| | | 318/783 |
| 8,520,413 B2 * | 8/2013 | Tran ................... H02M 3/155 |
| | | 323/222 |

(Continued)

FOREIGN PATENT DOCUMENTS

| JP | 2007-282443 A | 10/2007 |
| JP | 4325747 B2 | 9/2009 |

(Continued)

OTHER PUBLICATIONS

Official Communication issued in International Patent Application No. PCT/JP2016/064862, dated Aug. 2, 2016.

*Primary Examiner* — Fred E Finch, III
*Assistant Examiner* — Rafael O. De León Domenench
(74) *Attorney, Agent, or Firm* — Keating & Bennett, LLP

(57) ABSTRACT

A DC-DC converter includes an inductor device with an inductance value that is switched between a first inductance and a second inductance larger than the first inductance in a case where a load includes a first load and a second load heavier than the first load and a switching circuit electrically connected to the inductor device. The inductor device includes a first coil, a second coil, and a switching element with a resistance value that is controlled in accordance with the load. A circuit in which the second coil and the switching element are electrically connected in series and the first coil are electrically connected in parallel.

9 Claims, 8 Drawing Sheets

(51) Int. Cl.
 *H02M 3/155* (2006.01)
 *H02M 3/158* (2006.01)
 *H02M 1/00* (2006.01)

(56) References Cited

U.S. PATENT DOCUMENTS

| | | | |
|---|---|---|---|
| 2005/0184712 A1* | 8/2005 | Wei | H02M 3/156 |
| | | | 323/282 |
| 2007/0096703 A1* | 5/2007 | Jain | H02M 3/158 |
| | | | 323/282 |
| 2009/0201005 A1 | 8/2009 | Noma et al. | |
| 2013/0119953 A1* | 5/2013 | Murase | H02M 3/1588 |
| | | | 323/271 |
| 2013/0229167 A1* | 9/2013 | Hiei | H02M 1/44 |
| | | | 323/355 |

FOREIGN PATENT DOCUMENTS

| | | |
|---|---|---|
| JP | 2010-220360 A | 9/2010 |
| JP | 2013-222841 A | 10/2013 |
| JP | 2014-073037 A | 4/2014 |

\* cited by examiner

DC-DC CONVERTER, SWITCHING IC, AND INDUCTOR DEVICE

CROSS REFERENCE TO RELATED APPLICATIONS

This application claims the benefit of priority to Japanese Patent Application No. 2015-110028 filed on May 29, 2015 and is a Continuation Application of PCT Application No. PCT/JP2016/064862 filed on May 19, 2016. The entire contents of each application are hereby incorporated herein by reference.

BACKGROUND OF THE INVENTION

1. Field of the Invention

The present invention relates to a DC-DC converter, and a switching IC and an inductor device which are included in a DC-DC converter, and, in particular, to a technique for significantly reducing or preventing a ripple generated in a voltage output from a DC-DC converter.

2. Description of the Related Art

DC-DC converters are known in which a coil is provided and on one main surface of which a switching integrated circuit (IC) electrically connected to the coil is located (see, for example, Japanese Patent No. 4325747 and Japanese Unexamined Patent Application Publication No. 2013-222841).

Japanese Patent No. 4325747 discloses a DC-DC converter module. In the DC-DC converter module, a multilayer board includes a magnetic substrate and a connection wiring line electrically connecting an upper electrode and a lower electrode provided on the magnetic substrate includes an inner conductor that is different from a coil and passes through the inside of the magnetic substrate. The upper electrode is electrically connected to a switching IC and a capacitor which are included in the module. The lower electrode is electrically connected to the outside of the module.

Accordingly, the connection wiring line includes a relatively large inductance component. A pulse current therefore hardly flows through the connection wiring line. As a result, the leakage of high-frequency noise to the outside of the module is significantly reduced or prevented.

Japanese Unexamined Patent Application Publication No. 2013-222841 discloses an inductor array chip including a plurality of inductors with different inductance values in a multilayer board and a multiphase DC-DC converter including the inductor array chip. In the inductor array chip, at least one of the inductors includes a plurality of parallel-connected partial inductors.

A crack is easily generated at the time of firing of an inductor array chip in a case where a plurality of inductors including different numbers of coil conductors is located in a magnetic multilayer board. However, since an inductor including a plurality of parallel-connected partial inductors is able to include a smaller inductance value, there are able to be provided inductors that include the same number of coil conductors and include different inductance values in accordance with the electrical connection of partial inductors. As a result, an inductor array chip where a crack is hardly generated at the time of firing is able to be obtained.

However, in the DC-DC converter disclosed in Japanese Patent No. 4325747 and the multiphase DC-DC converter disclosed in Japanese Unexamined Patent Application Publication No. 2013-222841, an output voltage is generated by a fixed inductor. There is room for improvement in the reduction or prevention in ripple generated in an output voltage.

SUMMARY OF THE INVENTION

Preferred embodiments of the present invention provide DC-DC converters that are able to significantly reduce or prevent a ripple generated in an output voltage, and switching ICs and inductor devices which are included in the DC-DC converters.

A DC-DC converter according to a preferred embodiment of the present invention generates an adjusted output voltage from an input voltage and supplies the adjusted output voltage to a load. The DC-DC converter includes an inductor device with an inductance value that is switched between a first inductance and a second inductance larger than the first inductance in a case where the load includes a first load and a second load heavier than the first load and a switching circuit electrically connected to the inductor device. The inductor device includes a first coil, a second coil, and a switching element with a conductive state and a non-conductive state that are controlled in accordance with the load. A circuit in which the second coil and the switching element are electrically connected in series and the first coil are electrically connected in parallel.

The inventors noticed that a ripple in an output voltage was smaller in a case where a DC-DC converter including an inductor with a smaller inductance value was included in a pulse frequency modulation (PFM) operation at a light load and was smaller in a case where a DC-DC converter including an inductor with a larger inductance value was included in a pulse width modulation (PWM) operation at a heavy load.

With the above-described structure in which an inductor device is included whose inductance value is switched between a first inductance and a second inductance larger than the first inductance in a case where the load includes a first load and a second load heavier than the first load, a ripple in an output voltage is able to be significantly reduced or prevented in both the PFM operation at a light load and the PWM operation at a heavy load.

The switching circuit may include a switching IC. The switching element may be located in the switching IC.

Accordingly, the switching element included in the switching IC changes the inductance value of the inductor device. Therefore, the switching IC is able to control the inductance value of the inductor device.

The switching circuit may include a switching IC. The switching element may be located separately from the switching IC.

Accordingly, the switching element located separately from the switching IC controls the inductance value of the inductor device. Therefore, an increase in a degree of flexibility in controlling the inductance value of the inductor device is able to be provided.

The first coil and the second coil may be provided in a multilayer board in which a plurality of substrate layers is laminated.

By located the switching IC and a capacitor on the multilayer board in which the first coil and the second coil are located, an ultra-compact DC-DC converter module is able to be provided.

The switching element may be brought into conduction in a case where a predetermined light load condition is satisfied at the load.

The switching circuit may operate in one of operation modes, a pulse width modulation mode and a pulse frequency modulation mode, selected in accordance with the load. The switching element may be brought into conduction in a case where the switching circuit operates in the pulse frequency modulation mode.

Accordingly, the switching element is brought into conduction at a light load and the inductance value of the inductor device is changed to a parallel inductance of the first coil and the second coil. The switching element is brought out of conduction at a heavy load and the inductance value of the inductor device is changed to a single inductance of the first coil larger than the parallel inductance. That is, the inductance value of the inductor device is able to be changed by the switching element.

The switching element may be a thermistor with a positive temperature coefficient, for example.

Accordingly, at a light load, the decrease in temperature decreases the resistance value of the thermistor. The inductance value of the inductor device is therefore closer to a parallel inductance of the first coil and the second coil. At a heavy load, the increase in temperature increases the resistance value of the thermistor. The inductance value of the inductor device is therefore closer to a single inductance of the first coil larger than the parallel inductance. Since the inductance value of the inductor device is thus autonomously controlled, the switching IC does not need to control an inductance value.

A switching IC according to a preferred embodiment of the present invention is included in a DC-DC converter that generates an adjusted output voltage from an input voltage and supplies the adjusted output voltage to a load. The switching IC includes a first coil terminal to which a first end of a first coil is electrically connected, a second coil terminal to which a first end of a second coil is electrically connected, a switching circuit electrically connected to the first coil terminal, and a switching element that provides an electrical connection between the first coil terminal and the second coil terminal into conduction in a case where a predetermined light load condition is satisfied at the load and bring the electrical connection between the first coil terminal and the second coil terminal out of conduction in a case where the light load condition is not satisfied at the load. A second end of the second coil is electrically connected to a second end of the first coil.

Accordingly, a switching IC that controls the inductance value of the inductor device is able to be provided to provide a DC-DC converter that is able to significantly reduce or prevent a ripple in an output voltage in both the PFM operation at a light load and the PWM operation at a heavy load.

A switching IC according to a preferred embodiment of the present invention is included in a DC-DC converter that generates an adjusted output voltage from an input voltage and supplies the adjusted output voltage to a load. The switching IC includes a coil terminal electrically connected to an inductor device with an inductance that is switched between a first inductance and a second inductance larger than the first inductance in accordance with a control signal, a switching circuit electrically connected to the coil terminal, and an inductance control terminal that outputs a signal indicating whether a predetermined light load condition is satisfied at the load as the control signal.

Accordingly, a switching IC that controls the inductance value of the inductor device in accordance with a control signal is able to be provided to provide a DC-DC converter that is able to significantly reduce or prevent a ripple in an output voltage in both the PFM operation at a light load and the PWM operation at a heavy load.

An inductor device according to a preferred embodiment of the present invention includes a first coil provided in a multilayer board in which a plurality of substrate layers are laminated, a second coil provided in the multilayer board, a control terminal that receives a control signal, and a switching element with a conductive state and a non-conductive state that are switched in accordance with the received control signal. A circuit in which the second coil and the switching element are electrically connected in series and the first coil are electrically connected in parallel.

Accordingly, an inductance device whose inductance value is changed in accordance with a control signal is able to be provided to provide a DC-DC converter that is able to significantly reduce or prevent a ripple in an output voltage in both the PFM operation at a light load and the PWM operation at a heavy load.

An inductor device according to a preferred embodiment of the present invention includes a first coil provided in a multilayer board in which a plurality of substrate layers are laminated, a second coil provided in the multilayer board, and a thermistor that is located in/on the multilayer board and includes a positive temperature coefficient. A circuit in which the second coil and the thermistor are electrically connected in series and the first coil are electrically connected in parallel.

Accordingly, an inductance device whose inductance value is autonomously changed is able to be provided to provide a DC-DC converter that is able to significantly reduce or prevent a ripple in an output voltage in both the PFM operation at a light load and the PWM operation at a heavy load.

With a DC-DC converter module according to a preferred embodiment of the present invention, a switching IC according to a preferred embodiment of the present invention, and an inductor device according to a preferred embodiment of the present invention, a DC-DC converter is able to significantly reduce or prevent a ripple generated in an output voltage in both a PFM operation at a light load and a PWM operation at a heavy load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
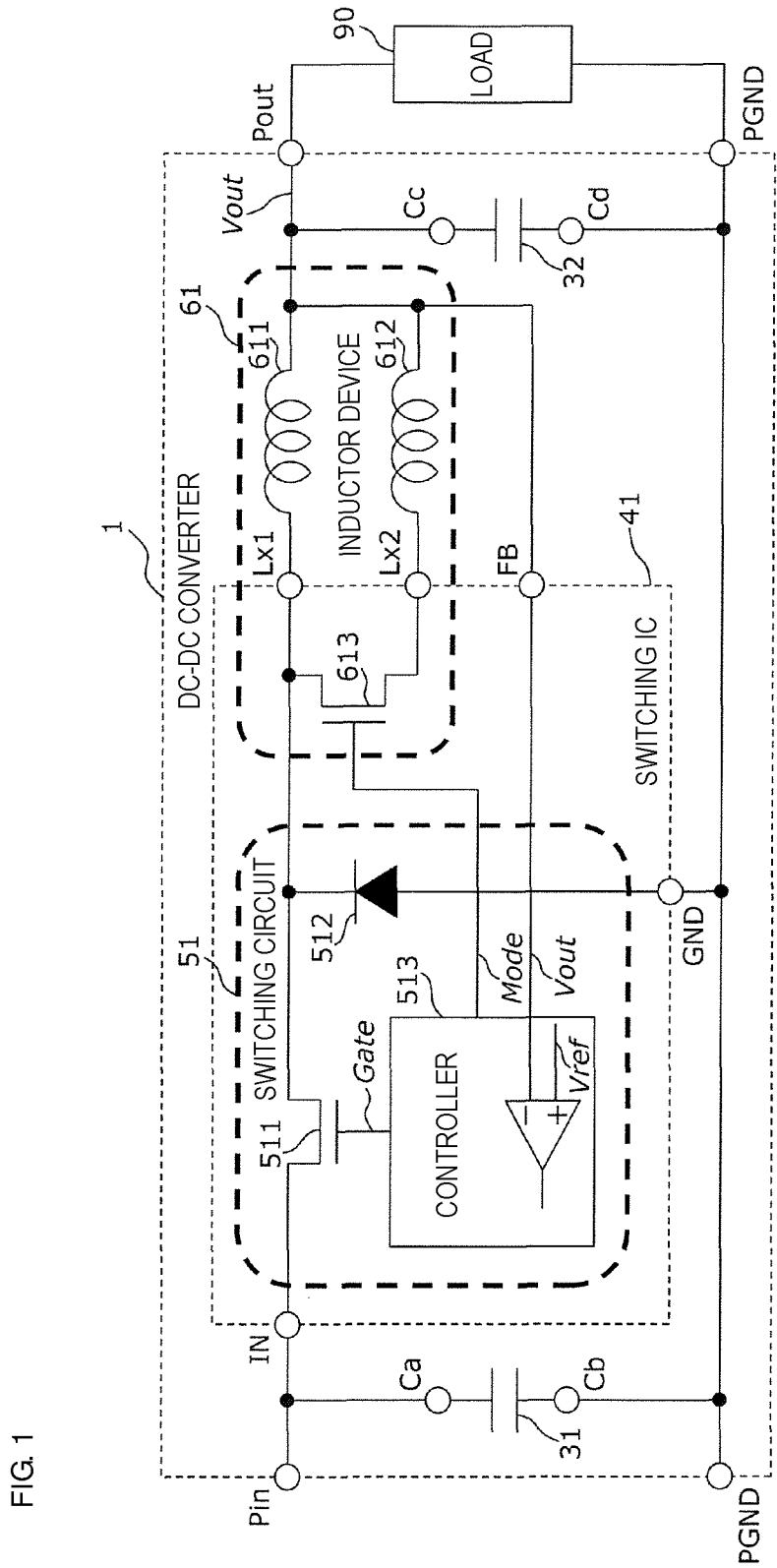
FIG. 1 is a circuit block diagram of a DC-DC converter according to a first preferred embodiment of the present invention.

Preferred embodiments of the present invention will be described in detail below with reference to the drawings. Each of the preferred embodiments to be described below represents a comprehensive or concrete example. The numerical values, shapes, materials, components, arrangement of components, coupling features and elements, manufacturing steps, and order of manufacturing steps to be described in the following preferred embodiments are merely examples, and do not limit the present invention. Components not described in the independent claim among the components in the following preferred embodiments are described as optional components. Also, the sizes or the ratio of sizes of the components illustrated in the drawings are not necessarily precise.

First Preferred Embodiment

A DC-DC converter according to a first preferred embodiment of the present invention is a switching power supply device that generates an adjusted output voltage from an input voltage and supplies the output voltage to a load. The DC-DC converter includes an inductor device whose inductance value is switched between a first inductance and a second inductance larger than the first inductance in a case where the load includes a first load and a second load heavier than the first load.

First, a functional configuration of the DC-DC converter will be described. After that, a structural feature of the DC-DC converter will be described.

FIG. 1 is a circuit block diagram of a DC-DC converter according to the first preferred embodiment. A DC-DC converter 1 is, for example, a step-down converter that operates in one of PWM and PFM operation modes selected in accordance with a load. In FIG. 1, a load 90 is illustrated along with the DC-DC converter 1.

As illustrated in FIG. 1, the DC-DC converter 1 includes an input-side smoothing capacitor 31, a switching circuit 51, an inductor device 61, and an output-side smoothing capacitor 32. The switching circuit 51 includes a transistor 511, a diode 512, and a controller 513. The inductor device 61 includes a first coil 611, a second coil 612, and a switching element 613.

The DC-DC converter 1 may be a module component in which a switching IC 41 including the switching circuit 51 and the switching element 613 and the capacitors 31 and 32 are located at a multilayer board where the first coil 611 and the second coil 612 are located. The switching IC 41 includes a metal oxide semiconductor (MOS). The transistor 511 and the switching element 613 may be field-effect transistors (FETs).

The DC-DC converter 1 that is a module component includes an input terminal Pin, an output terminal Pout, and a common ground terminal PGND. The switching IC 41 includes an input terminal IN, a first coil terminal Lx1, a second coil terminal Lx2, a feedback terminal FB, and a ground terminal GND.

One end of the capacitor 31 is electrically connected to an input voltage power line between the input terminal Pin and the input terminal IN, and the other end of the capacitor 31 is electrically connected to the ground terminal PGND. One end of the capacitor 32 is electrically connected to an output voltage power line between the output terminal Pout and the feedback terminal FB, and the other end of the capacitor 32 is electrically connected to the ground terminal PGND.

The switching circuit 51 continuously applies an input voltage supplied to the input terminal Pin to the inductor device 61 to significantly reduce or prevent an error between an output voltage Vout applied to the feedback terminal FB and an internally generated reference voltage Vref.

The controller 513 determines whether a predetermined light load condition is satisfied, outputs a signal Mode representing a determination result, and selects, as an operation mode, PFM in a case where the light load condition is satisfied and PWM in a case where the light load condition is not satisfied. The controller 513 generates a signal Gate on the basis of the selected operation mode to control the conduction and non-conduction of the transistor 511.

The controller 513 determines whether a predetermined light load condition is satisfied on the basis of a known criterion. The criterion is not limited to a specific criterion. For example, the controller 513 may determine that a light load condition is satisfied when detecting a discontinuous mode in which a current flowing through the inductor device 61 becomes 0 in a switching period. Alternatively, the controller 513 may determine that a light load condition is satisfied when the output voltage Vout is larger than a predetermined threshold value or a current flowing through a terminal Pout is smaller than a predetermined threshold value.

The transistor 511 is brought into and out of conduction in accordance with the signal Gate to continuously apply an input voltage supplied to the input terminal Pin to the inductor device 61.

The inductor device 61 stores magnetic energy from an input voltage in the conduction period of the transistor 511. In the non-conduction period of the transistor 511, the inductor device 61 outputs a voltage generated by a counter-electromotive force via the diode 512 without superimposing the voltage on an input voltage to generate an output voltage Vout lower than the input voltage.

In the inductor device 61, a circuit in which the second coil 612 and the switching element 613 are electrically connected in series and the first coil 611 are electrically connected in parallel. The switching element 613 is brought into conduction when the light load condition is determined to be satisfied in accordance with the signal Mode and is brought out of conduction when the light load condition is determined not to be satisfied. The inductor device 61 includes an inductance value in accordance with the signal Mode, that is, includes a parallel inductance of the first coil 611 and the second coil 612 at a light load and a single inductance of the first coil 611 at a heavy load. The single inductance of the first coil 611 is larger than the parallel inductance of the first coil 611 and the second coil 612.

In a case where one of PFM and PWM is selected on the basis of a result of determination of whether the light load condition is satisfied, the switching between inductance values of the inductor device 61 is performed in synchronization with the switching between PFM and PWM. That is, the switching element 613 is brought into conduction in a case where the switching circuit 51 performs a PFM operation, and is brought out of conduction in a case where the switching circuit 51 performs a PWM operation. As a result, the inductance value of the inductor device 61 is switched between the parallel inductance of the first coil 611 and the second coil 612 in the PFM operation and the single inductance of the first coil 611 in the PWM operation.

The basics of the PWM operation and the PFM operation will be described. In the following, the principle of the PWM operation and the PFM operation in the DC-DC converter 1 will be described. The PWM operation and the PFM operation are able to be modified and improved as appropriate without departing from the basics.

Figure 2A:
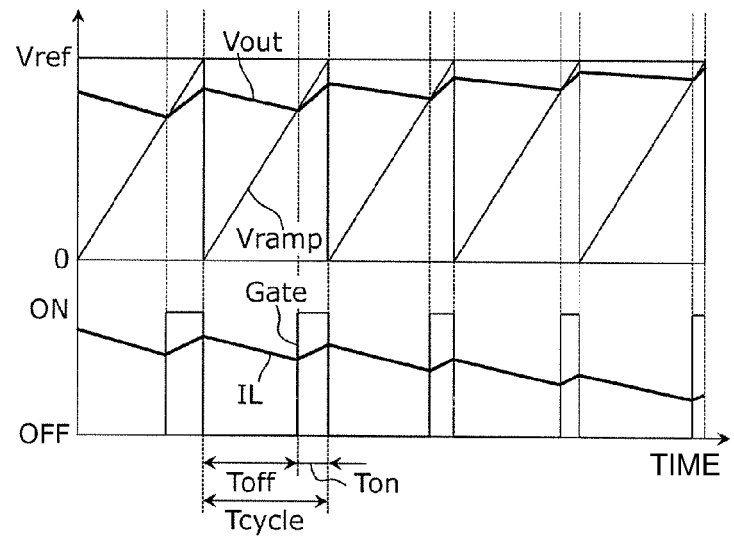
FIG. 2A is a waveform diagram illustrating a PWM operation.

FIG. 2A is a waveform diagram illustrating an exemplary basic PWM operation. As illustrated in FIG. 2A, in the basic PWM operation, a sawtooth signal Vramp and the output voltage Vout in a constant cycle Tcycle are compared with each other to generate a signal Gate. The signal Gate is at an OFF level in a period Toff in which the output voltage Vout is higher than or equal to the signal Vramp, and is at an ON level in a period Ton in which the output voltage Vout is lower than the signal Vramp.

In the PWM operation in which the switching cycle Tcycle is constant, on-duty, that is, the proportion of the period Ton in the cycle Tcycle, increases with the increase in the shortage of the output voltage Vout with respect to the reference voltage Vref. By performing the switching of the input voltage in accordance with the signal Gate, the output voltage Vout is adjusted to the reference voltage Vref.

Figure 2B:
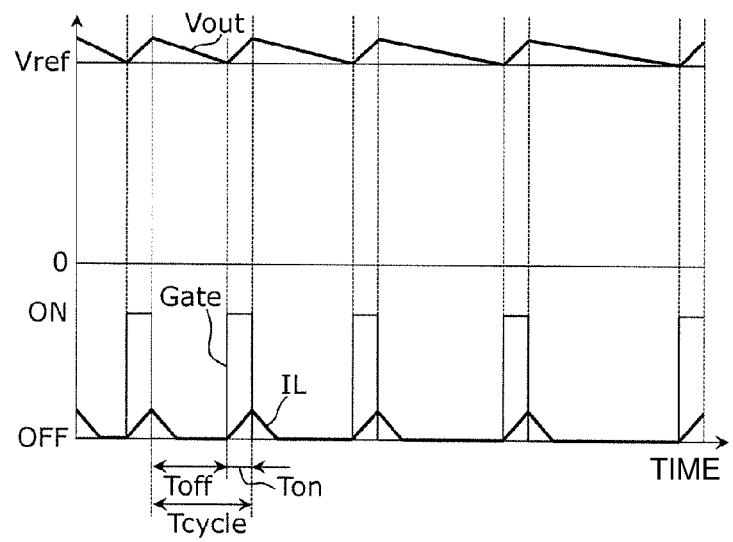
FIG. 2B is a waveform diagram illustrating a PFM operation.

FIG. 2B is a waveform diagram illustrating an exemplary basic PFM operation. As illustrated in FIG. 2B, in the basic PFM operation, the reference voltage Vref and the output voltage Vout are compared with each other to generate the signal Gate. The signal Gate is at an ON level in a predetermined period Ton after the output voltage Vout has been lower than or about equal to the reference voltage Vref and is at an OFF level in a period Toff before the output voltage Vout is lower than or about equal to the reference voltage Vref again.

In the PFM operation in which the period Ton is constant, a switching cycle Tcycle increases with the decrease in load. By performing the switching of the input voltage in accordance with the signal Gate, the output voltage Vout is adjusted to the reference voltage Vref.

Since a switching period is constant in the PWM operation, switching noise is able to be relatively easily managed. However, power required for switching at a light load relatively increases and power efficiency decreases. In contrast, since a switching frequency decreases at a light load in the PFM operation, the decrease in power efficiency is significantly reduced or prevented. In order to significantly reduce or prevent such a loss, the PWM operation and the PFM operation have been separately performed in accordance with, for example, a load.

The inventors noticed that an inductance value that significantly reduces or prevents a ripple in an output voltage varied in the PFM operation and the PWM operation while studying in detail how to separately implement the PFM operation and the PWM operation. Specifically, with two DC-DC converters including respective inductors with different inductance values, the generation of ripples in output voltages in the PFM operation and the PWM operation was simulated. As a result, in the PFM operation, a ripple in an output voltage was smaller in a DC-DC converter including an inductor with a smaller inductance value. In the PWM operation, in the PFM operation, a ripple in an output voltage was smaller in a DC-DC converter including an inductor with a larger inductance value.

This result shows that suitable conditions for significantly reducing or preventing a ripple in an output voltage differ in the PFM operation and the PWM operation. That is, if the PFM operation and the PWM operation are performed in a DC-DC converter including an inductor with a fixed inductance value, a ripple in an output voltage is not likely to be significantly reduced or prevented in one of the PFM operation and the PWM operation. For example, if an inductor with a large fixed inductance value is included to compensate for the reduction in inductance value due to DC superposition characteristics in the PWM operation at a heavy load, a ripple in an output voltage may be increased in the PFM operation at a light load.

In the DC-DC converter 1, the inductor device 61 is included and has an inductance value that is switched between a first inductance and a second inductance larger than the first inductance in a case where the load includes a first load and a second load heavier than the first load. As a result, in both the PFM operation and the PWM operation, a ripple in an output voltage is able to be significantly reduced or prevented.

Next, the DC-DC converter 1 will be described.

Figure 3:
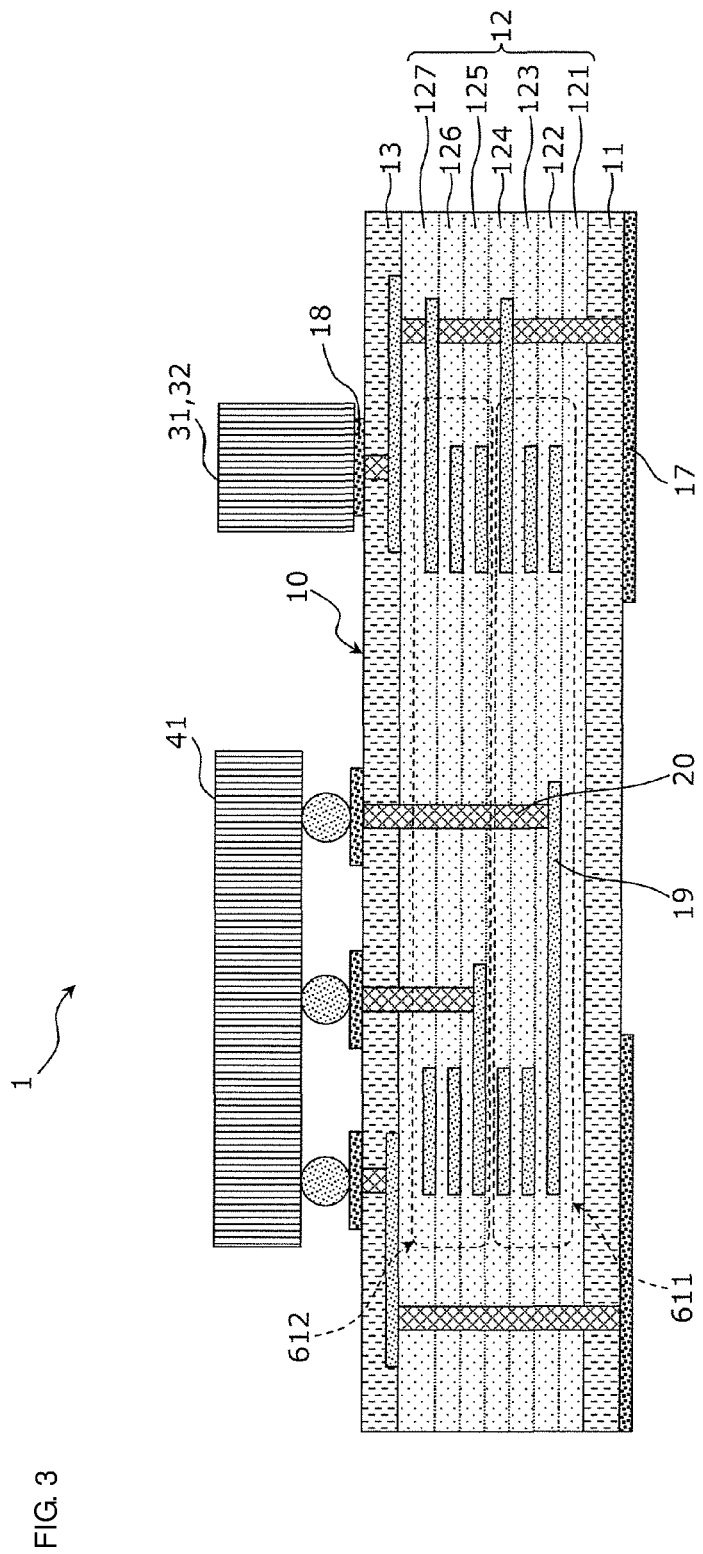
FIG. 3 is a cross-sectional view of a DC-DC converter according to the first preferred embodiment of the present invention.

FIG. 3 is a cross-sectional view of the DC-DC converter 1. In the following, components of the same or similar type are represented by the same pattern and the application of a reference numeral thereto is omitted as appropriate for the simplification of a drawing. In addition, some components in different cross sections are sometimes illustrated in the same drawing.

As illustrated in FIG. 3, the first coil 611 and the second coil 612 are located in a multilayer board 10 in the DC-DC converter 1 and the switching IC 41 and the capacitors 31 and 32 are located on one main surface of the multilayer board 10.

The multilayer board 10 includes a core magnetic substance layer 12, a first non-magnetic substance layer 11 provided on one main surface of the core magnetic substance layer 12, and a second non-magnetic substance layer 13 provided on the other main surface of the core magnetic substance layer 12. The first non-magnetic substance layer 11 is a surface layer of one main surface of the multilayer board 10 and is exposed on the multilayer board 10. The second non-magnetic substance layer 13 is a surface layer of the other main surface of the multilayer board 10 and is exposed on the multilayer board 10.

In the example illustrated in FIG. 3, the core magnetic substance layer 12 includes laminated magnetic substance layers 121 to 127. Each of the first non-magnetic substance layer 11 and the second non-magnetic substance layer 13 includes a single layer structure, but may include the laminate of a plurality of non-magnetic substance layers.

At the multilayer board 10, various conductors including the first coil 611 and the second coil 612 that define the circuit of the DC-DC converter 1 are provided. These conductors include a surface electrode 17 that provides the DC-DC converter 1 on a mother board, for example, a printed circuit board, a surface electrode 18 that provides the switching IC 41 and the capacitors 31 and 32 on the multilayer board 10, an in-plane wiring conductor 19 located along the surfaces of a magnetic substance layer and a non-magnetic substance layer, and an interlayer connection conductor 20 provided in the thickness direction of magnetic substance layers and non-magnetic substance layers.

Each of the first non-magnetic substance layer 11 and the second non-magnetic substance layer 13 includes, for example, a ceramic substrate with a low magnetic permeability or a non-magnetic ceramic substrate. Each layer in the core magnetic substance layer 12 includes, for example, a magnetic ceramic substrate with a magnetic permeability larger than that of the first non-magnetic substance layer 11 and the second non-magnetic substance layer 13. The first non-magnetic substance layer 11, the second non-magnetic substance layer 13, and each layer in the core magnetic substance layer 12 together are referred to as substrate layers.

A magnetic ceramic substrate is made of, for example, magnetic ferrite ceramic. Specifically, ferrite including iron oxide as a main component and including one or more of zinc, nickel, and copper is included. A non-magnetic ceramic substrate is made of, for example, non-magnetic ferrite ceramic or alumina ceramic including alumina as a main component.

The surface electrodes 17 and 18, the in-plane wiring conductor 19, and the interlayer connection conductor 20 are made of, for example, a metal or an alloy including silver as a main component. Plating may be applied to the surface electrodes 17 and 18 with, for example, nickel, palladium, or gold.

Magnetic ferrite ceramic or non-magnetic ferrite ceramic defining each layer in the multilayer board 10 preferably is low temperature co-fired ceramic (LTCC), for example. Since the firing temperature of the multilayer board 10 is lower than or about equal to the melting point of silver, silver is able to be included to define the above-described conductors. By including silver with a low resistivity to define the in-plane wiring conductor 19 and the interlayer connection conductor 20, a low-loss DC-DC converter with superior circuit characteristics (e.g., power efficiency) is provided. In particular, by including silver to define the above-described conductors, the multilayer board 10 is able to be fired under an oxidizing atmosphere, for example, the air.

Figure 4:
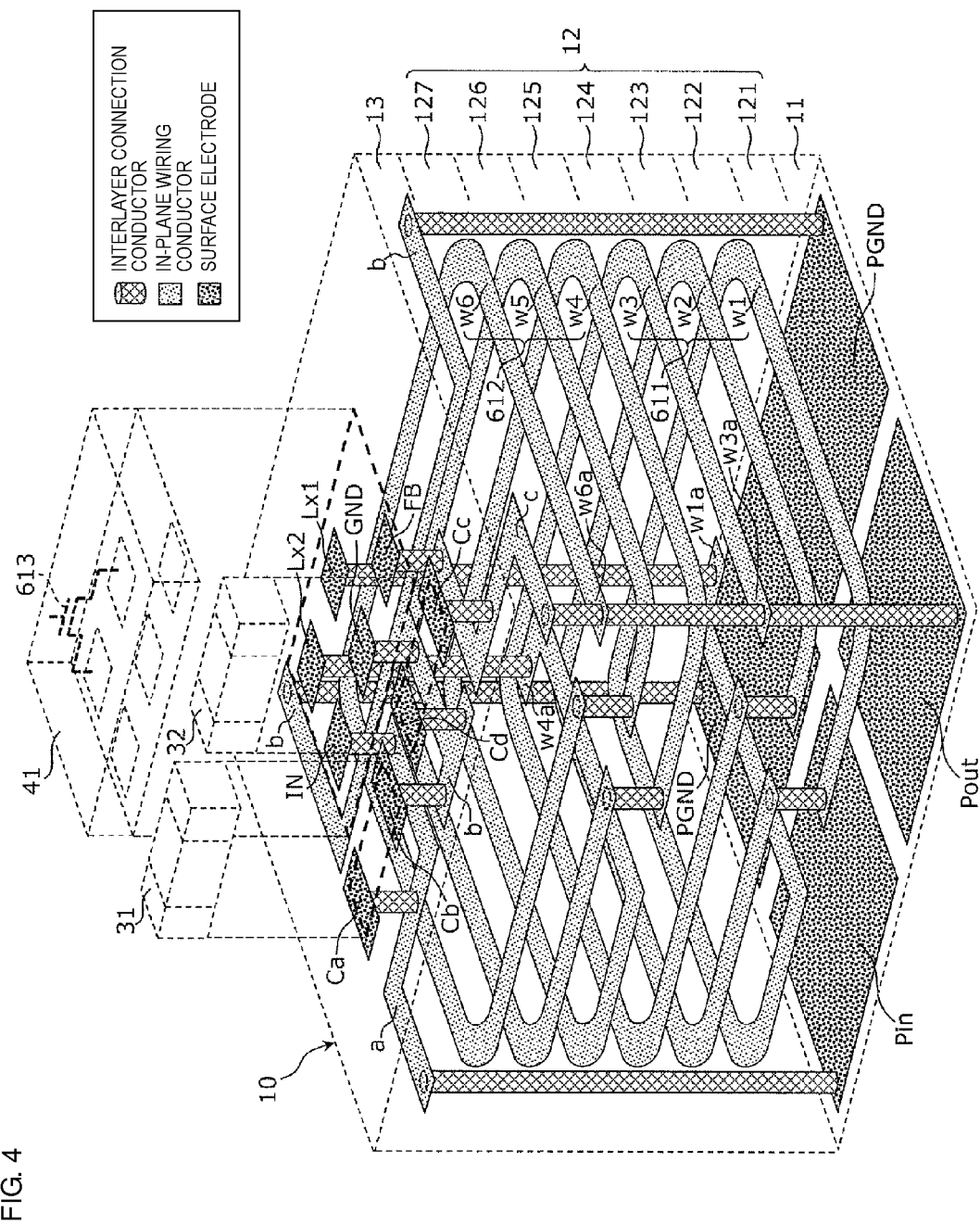
FIG. 4 is a perspective view of conductors at a DC-DC converter according to the first preferred embodiment of the present invention.

FIG. 4 is a perspective view illustrating conductors at the multilayer board 10. In FIG. 4, for ease of visualization, the multilayer board 10 is enlarged in a thickness direction and a substrate defining each layer is transparent to illustrate only conductors. The conductors illustrated in FIG. 4 correspond to the cross-sectional view in FIG. 3 and the circuit block diagram in FIG. 1. In the following description, one of main surfaces of a layer on the lower side of a drawing is sometimes referred to as a back side and the other one of main surfaces of the layer on the upper side of the drawing is sometimes referred to as a front side.

On the back side of the first non-magnetic substance layer 11, the ground terminal PGND, the input terminal Pin, and the output terminal Pout are provided as the surface electrodes 17. These terminals are coupled to corresponding terminals on a mother board via a conductive joining material, for example, solder.

On the front side of the second non-magnetic substance layer 13, the ground terminal GND, the input terminal IN, the feedback terminal FB, the first coil terminal Lx1, the second coil terminal Lx2, and capacitor terminals Ca, Cb, Cc, and Cd are provided as the surface electrodes 18. These terminals are coupled to corresponding terminals of the switching IC 41 or the corresponding terminals of the capacitors 31 and 32 via a conductive joining material, for example, solder.

On the back side of the second non-magnetic substance layer 13, routing in-plane wiring conductors a, b, and c are provided.

On the back side of the magnetic substance layers 122 to 127, loop in-plane wiring conductors w1 to w6 defining coils are located, respectively.

One end w1a of the in-plane wiring conductor w1 is electrically connected to the first coil terminal Lx1 via the interlayer connection conductor and the in-plane wiring conductor. The other end of the in-plane wiring conductor w1 is electrically connected to one end of the in-plane wiring conductor w2 via the interlayer connection conductor. The other end of the in-plane wiring conductor w2 is electrically connected to one end of the in-plane wiring conductor w3 via the interlayer connection conductor. The in-plane wiring conductors w1 to w3 define the coil 611.

One end w4a of the in-plane wiring conductor w4 is electrically connected to the second coil terminal Lx2 via the interlayer connection conductor and the in-plane wiring conductor. The other end of the in-plane wiring conductor w4 is electrically connected to one end of the in-plane wiring conductor w5 via the interlayer connection conductor. The other end of the in-plane wiring conductor w5 is electrically connected to one end of the in-plane wiring conductor w6 via the interlayer connection conductor. The in-plane wiring conductors w4 to w6 define the coil 612.

The other end w3a of the in-plane wiring conductor w3 and the other end w6a of the in-plane wiring conductor w6 are electrically connected to the capacitor terminal Cc and the feedback terminal FB via the interlayer connection conductor and an in-plane wiring conductor c, and are electrically connected to the output terminal Pout via the interlayer connection conductor.

The ground terminal GND is electrically connected to the ground terminal PGND and the capacitor terminals Cb and Cd via the interlayer connection conductor and an in-plane wiring conductor b.

The input terminal IN is electrically connected to the input terminal Pin and the capacitor terminal Ca via the interlayer connection conductor and an in-plane wiring conductor a.

The switching IC 41 and the capacitors 31 and 32 are provided on the front side of the second non-magnetic substance layer 13 of the multilayer board 10 including the conductors as described above, so that the DC-DC converter 1 is provided. The conductors at the multilayer board 10 are not limited to the example illustrated in FIG. 4, and may be changed as appropriate on the condition that a circuit equivalent to the circuit illustrated in FIG. 1 is provided.

Next, a non-limiting exemplary method of manufacturing the DC-DC converter 1 will be described.

First, ceramic green sheets to be respective layers of the multilayer board 10 are prepared. Specifically, slurry including magnetic ceramic powder is formed into a sheet to prepare a ceramic green sheet for a magnetic substance layer and slurry including non-magnetic ceramic powder is formed into a sheet to prepare a ceramic green sheet for a non-magnetic substance layer.

Subsequently, a through-hole is formed at a predetermined position on a predetermined ceramic green sheet on the basis of, for example, as illustrated in FIG. 4. A conductive paste is filled into the through-hole to define an interlayer connection conductor (via-hole conductor). At a predetermined position of the main surface of the ceramic green sheet, printing is performed with a conductive paste to define an in-plane wiring conductor pattern or a surface electrode pattern. The through-hole is formed by, for example, laser processing. The in-plane wiring conductor pattern or the surface electrode pattern is able to be defined by screen printing with a conductive paste including, for example, Ag powder.

Subsequently, the ceramic green sheets on which conductive pastes are placed are aligned, stacked, and press-bonded to be integrated into a green laminate. The green laminate is then fired. As a result of the firing, magnetic ceramic powder and non-magnetic ceramic powder included in respective green sheets and Ag powder included in the conductive pastes are sintered.

Subsequently, the surface electrode 17 exposed on the first non-magnetic substance layer 11 of the fired laminate and the surface electrode 18 exposed on the second non-magnetic substance layer 13 of the fired laminates are subjected to plating. Specifically, a nickel plating film or a gold plating film is defined by electroless plating. Subsequently, the switching IC 41 and the capacitors 31 and 32 are located at the surface electrode 18 by, for example, reflow soldering.

The DC-DC converter 1 in which the switching IC 41 and the capacitors 31 and 32 are located on the second non-magnetic substance layer 13 is thus completed. The completed DC-DC converter 1 is located on a mother board, for example, a printed circuit board via the surface electrode 17 on the back side.

After the group of the DC-DC converters 1 has been provided by the above-described manufacturing method, the group may be separated into the DC-DC converters 1.

Next, the effect of the DC-DC converter 1 will be described.

In the DC-DC converter 1, as illustrated in FIG. 1, the inductor device 61 is included whose inductance value is switched between a first inductance and a second inductance larger than the first inductance in a case where the load 90 includes a first load and a second load heavier than the first load.

The switching between inductances in the inductor device 61 matches a condition to significantly reduce or prevent a ripple in an output voltage in both the PFM operation and the PWM operation which has been found by the inventors from simulation. As described above, this condition is that a ripple in an output voltage is smaller in a case where an inductor with a smaller inductance value is included in the PFM operation at a light load and is smaller in a case where an inductor with a larger inductance value is included in the PWM operation at a heavy load.

In the DC-DC converter 1, the inductance of the inductor device 61 is switched to the first inductance when the PFM operation is performed at a light load and the second inductance larger than the first inductance when the PWM operation is performed at a heavy load. As a result, in both the PFM operation at a light load and the PWM operation at a heavy load, a ripple in an output voltage is able to be significantly reduced or prevented.

As illustrated in FIG. 4, in the DC-DC converter 1, the in-plane wiring conductors w1 to w3 of the loop in-plane wiring conductors w1 to w6 provided in the magnetic substance layers 122 to 127 define the first coil 611 and the in-plane wiring conductors w4 to w6 define the second coil 612.

Since the first coil 611 and the second coil 612 overlap in the thickness direction in the same or substantially the same region on the main surface of the multilayer board 10, two coils are able to be provided with no increase in footprint on the multilayer board 10. In addition, the inductance value of the inductor device 61 is able to be changed by switching the electrical connection.

The first coil 611 and the second coil 612 may include the same magnetic characteristics or different magnetic characteristics. For example, the first coil 611, through which a large current flows in the PWM operation, may include a smaller direct-current resistance than the second coil 612. The second coil 612 included in only the PFM operation may have a smaller footprint and a smaller inductance value than the first coil 611.

The DC-DC converter 1 according to the first preferred embodiment has been described. The significant reduction or prevention in ripple in an output voltage which is realized in both the PFM operation and the PWM operation by the switching between inductance values has been described by taking, as an example, a step-down converter. A similar technique is able to be applied to a step-up converter. In the following, a step-up converter with a similar technique will be described.

Figure 5:
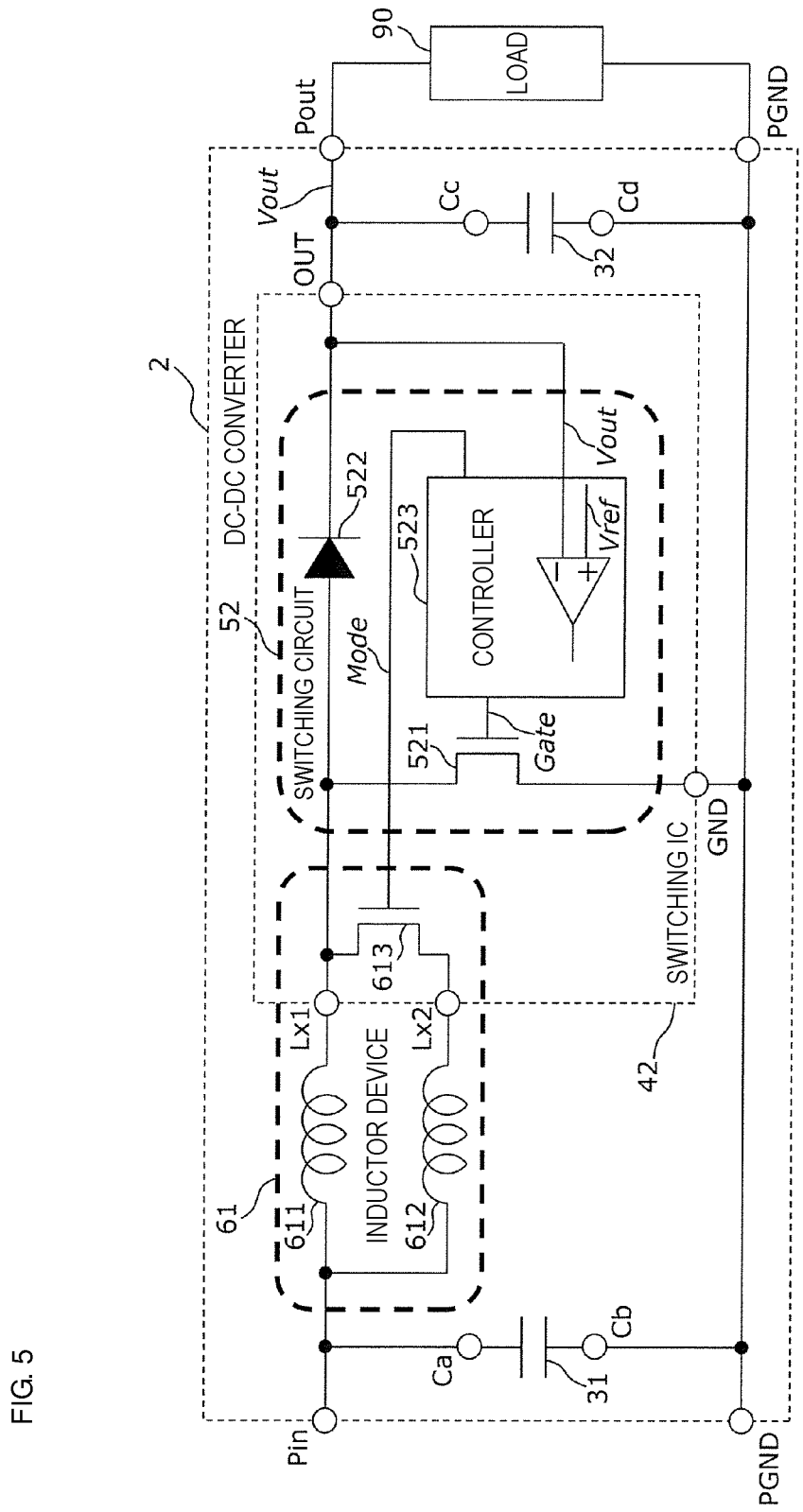
FIG. 5 is a circuit block diagram of a DC-DC converter that is a modification of the first preferred embodiment of the present invention.

FIG. 5 is a circuit block diagram of a DC-DC converter 2 that is a modification of the first preferred embodiment. The DC-DC converter 2 is, for example, a step-up converter that operates in one of PWM and PFM operation modes selected in accordance with a load.

The DC-DC converter 2 differs from the DC-DC converter 1 illustrated in FIG. 1 in that the inductor device 61 is located on an input side and a switching IC 42 with different features. In the switching IC 42, a switching circuit is changed to a switching circuit 52 for a step-up operation. In the following, the description of the matter common to the DC-DC converter 1 will be omitted as appropriate and different points will be mainly described.

The switching circuit 52 includes a transistor 521, a diode 522, and a controller 523.

The switching circuit 52 continuously applies an input voltage supplied to the input terminal Pin to the inductor device 61 to significantly reduce or prevent an error between the output voltage Vout applied to a feedback terminal FB and the internally generated reference voltage Vref.

The inductor device 61 stores magnetic energy from an input voltage in the conduction period of the transistor 521. The inductor device 61 superimposes a voltage generated by a counter-electromotive force upon an input voltage via the diode 522 in the non-conduction period of the transistor 521 and outputs a resultant voltage to generate the output voltage Vout higher than the input voltage.

The difference between the step-down operation and the step-up operation is whether a voltage generated by a counter-electromotive force of the inductor device 61 is superimposed to an input voltage to be output. In both of these operations, a ripple is generated in the output voltage Vout.

Similar to the DC-DC converter 1, in the DC-DC converter 2, the inductor device 61 is included and has an inductance value that is switched between a first inductance and a second inductance larger than the first inductance in a case where the load includes a first load and a second load heavier than the first load. As a result, in both the PFM operation and the PWM operation, a ripple in an output voltage is able to be significantly reduced or prevented.

Second Preferred Embodiment

In a second preferred embodiment of the present invention, a DC-DC converter in which a switching element that switches an inductance is provided separately from a switching IC will be described.

Figure 6:
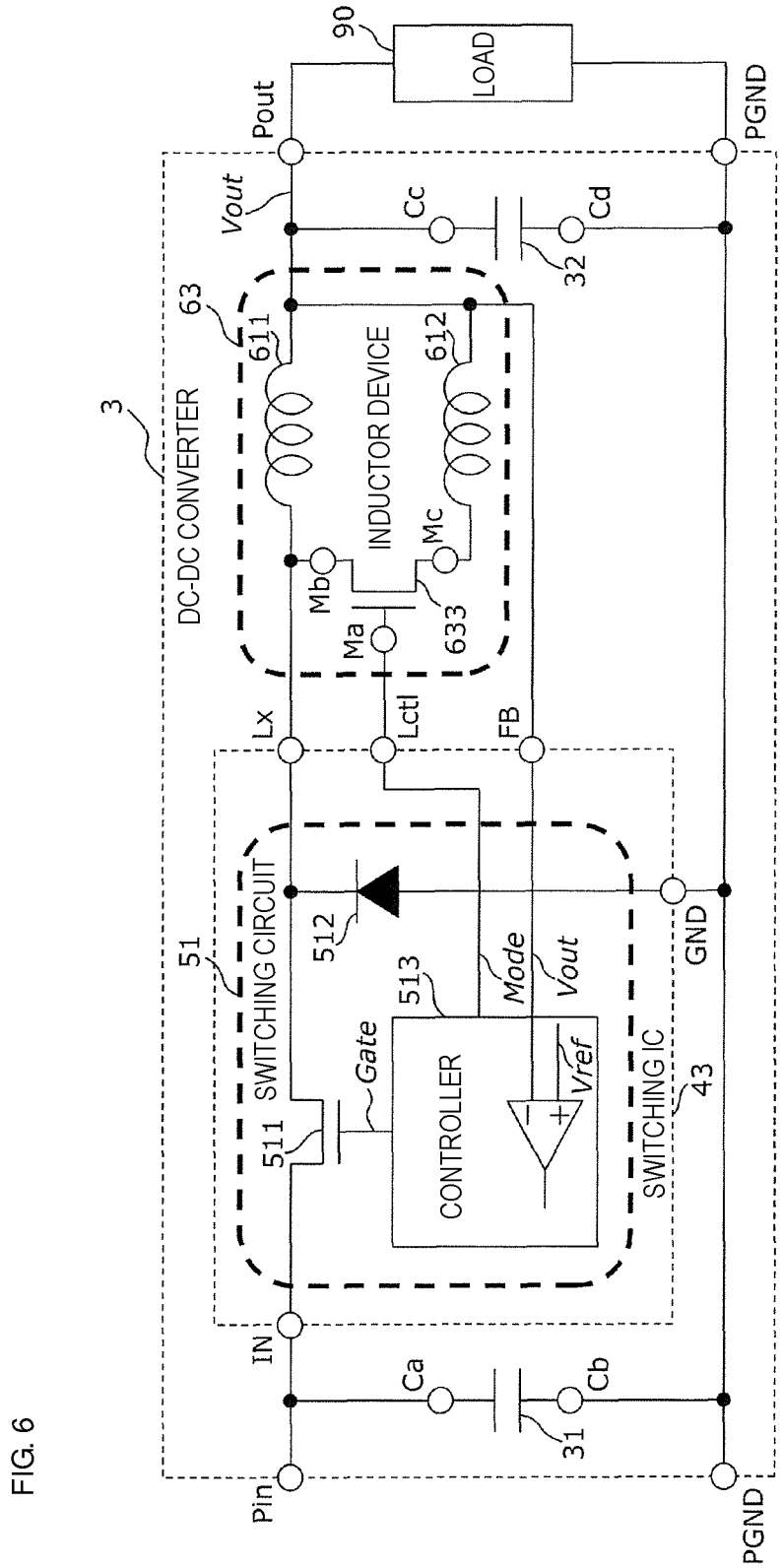
FIG. 6 is a circuit block diagram of a DC-DC converter according to a second preferred embodiment of the present invention.

FIG. 6 is a circuit block diagram of a DC-DC converter 3 according to the second preferred embodiment. The DC- DC converter 3 is, for example, a step-down converter that operates in one of PWM and PFM operation modes selected in accordance with a load. The DC-DC converter 3 differs from the DC-DC converter 1 illustrated in FIG. 1 in that a switching IC 43 and an inductor device 63 to be described below are provided.

The switching IC 43 includes a single coil terminal Lx and an inductance control terminal Lct1 instead of the first coil terminal Lx1 and the second coil terminal Lx2 of the switching IC 41. A signal Mode generated by the controller 513 is output to the inductance control terminal Lct1.

The inductor device 63 includes a switching element 633 provided separately from the switching IC 43. The switching element 633 may be a discrete component provided outside the switching IC 43, for example, a transistor located on a multilayer board along with the switching IC 43 and the capacitors 31 and 32.

The DC-DC converter 3 may be a module component in which a switching IC 43 including the switching circuit 51, the switching element 633, and the capacitors 31 and 32 are located on a multilayer board including the first coil 611 and the second coil 612 therein.

Figure 7:
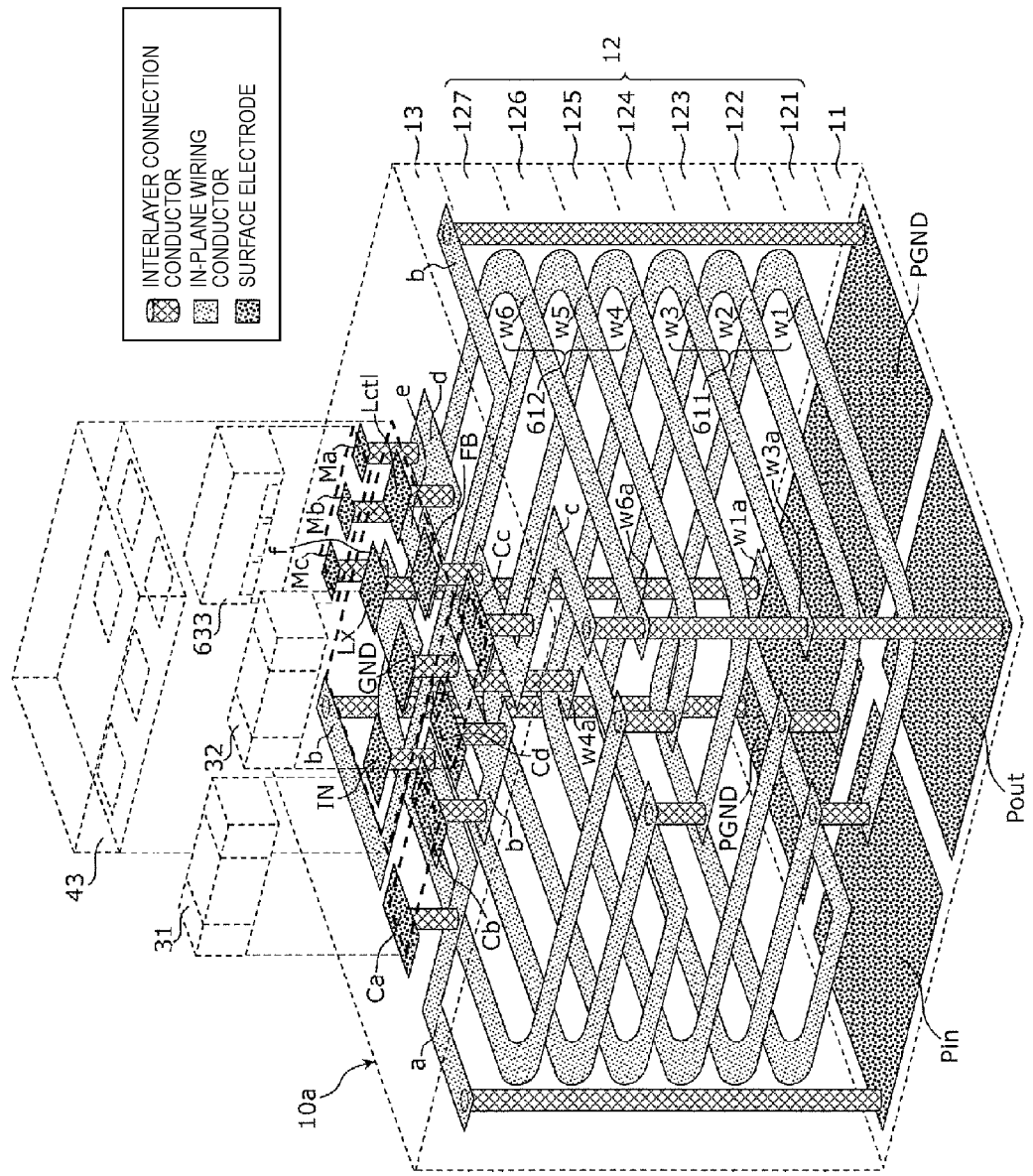
FIG. 7 is a perspective view of conductors at a DC-DC converter according to the second preferred embodiment of the present invention.

A multilayer board defining the DC-DC converter 3 is changed from the multilayer board 10 defining the DC-DC converter 1 as follows in response to a terminal change in the switching IC 43 and the change in the location of the switching element 633. FIG. 7 is a perspective view illustrating conductors at a multilayer board 10a in the DC-DC converter 3. In FIG. 7, for ease of visualization, the multilayer board 10a is enlarged in a thickness direction and a substrate defining each layer is transparent to illustrate only conductors. The features illustrated in FIG. 7, including the conductor, correspond to the circuit block diagram in FIG. 6.

On the multilayer board 10a, the ground terminal GND, the input terminal IN, the feedback terminal FB, the coil terminal Lx, the inductance control terminal Lct1, a switching control terminal Ma, switching terminals Mb and Mc, and the capacitor terminals Ca, Cb, Cc, and Cd are provided on the front side of the second non-magnetic substance layer 13. These terminals are coupled to corresponding terminals of the switching IC 43, the switching element 633, or the capacitors 31 and 32 via a conductive joining material, for example, solder.

On the back side of the second non-magnetic substance layer 13, routing in-plane wiring conductors d, e, and f are provided in addition to the routing in-plane wiring conductors a, b, and c.

The inductance control terminal Lct1 is electrically connected to the switching control terminal Ma via the interlayer connection conductor and the in-plane wiring conductor d.

The coil terminal Lx is electrically connected to one end w1a of the in-plane wiring conductor w1 via the interlayer connection conductor, and is also electrically connected to the switching terminal Mb via the interlayer connection conductor and the in-plane wiring conductor e.

The switching terminal Mc is electrically connected to one end w4a of the in-plane wiring conductor w4 via the interlayer connection conductor and the in-plane wiring conductor f.

The switching element 633 turns on and off the connection between the switching terminals Mb and Mc in accordance with the signal Mode transmitted from the switching control terminal Ma in a state of being electrically connected to the switching control terminal Ma and the switching terminals Mb and Mc.

Other features of the conductors at the multilayer board 10a other than those described above are the same as or similar to the features of the conductors at the multilayer board 10.

The switching IC 43, the switching element 633, and the capacitors 31 and 32 are located on the front side of the second non-magnetic substance layer 13 of the multilayer board 10a including the conductors as described above, so that the DC-DC converter 3 is provided. The conductors at the multilayer board 10a are not limited to the example illustrated in FIG. 7, and may be changed as appropriate on the condition that a circuit equivalent to the circuit illustrated in FIG. 6 is provided.

Similar to the DC-DC converter 1, in the DC-DC converter 3, the inductance of the inductor device 63 is switched to the first inductance when the PFM operation is performed at a light load and the second inductance larger than the first inductance when the PWM operation is performed at a heavy load. As a result, in both the PFM operation at a light load and the PWM operation at a heavy load, a ripple in an output voltage is able to be significantly reduced or prevented.

Since the first coil 611 and the second coil 612 overlap in the thickness direction in the same or substantially the same region on the main surface of the multilayer board 10a, two coils are able to be provided with no increase in footprint on the multilayer board 10a. In addition, the inductance value of the inductor device 63 is able to be changed by switching the electrical connection.

The first coil 611 and the second coil 612 may include the same magnetic characteristics or different magnetic characteristics. For example, the first coil 611, through which a large current flows in the PWM operation, may include a smaller direct-current resistance than the second coil 612. The second coil 612 included in only the PFM operation may have a smaller footprint and a smaller inductance value than the first coil 611.

Third Preferred Embodiment

In a third preferred embodiment of the present invention, a DC-DC converter including an inductor device that autonomously switches an inductance in accordance with a load will be described.

Figure 8:
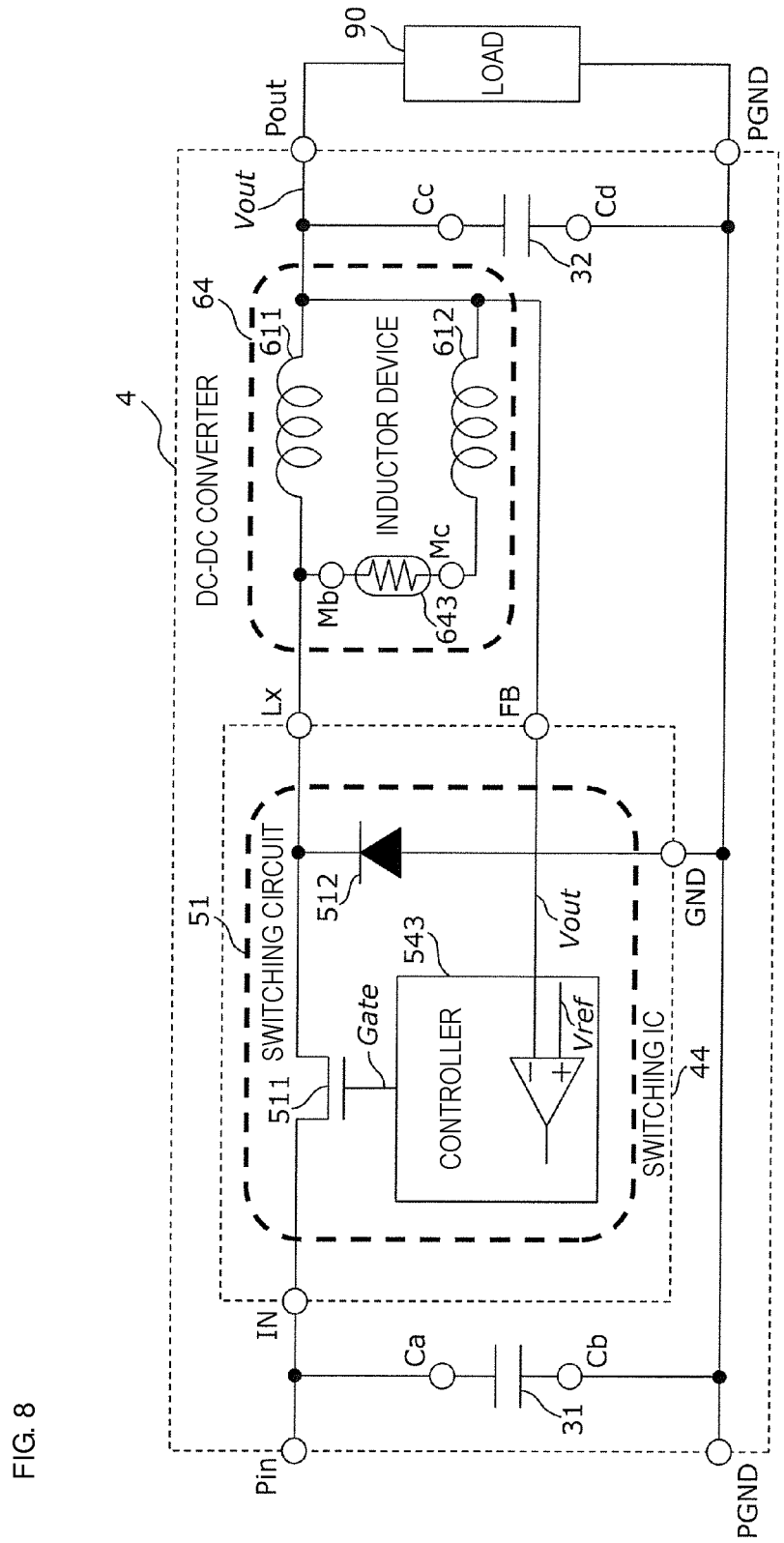
FIG. 8 is a circuit block diagram of a DC-DC converter according to a third preferred embodiment of the present invention.

FIG. 8 is a circuit block diagram of a DC-DC converter 4 according to the third preferred embodiment. The DC-DC converter 4 is, for example, a step-down converter that operates in one of PWM and PFM operation modes selected in accordance with a load. The DC-DC converter 4 differs from the DC-DC converter 3 illustrated in FIG. 6 in that a controller 543, a switching IC 44, and an inductor device 64 to be described below are provided.

The controller 543 internally processes the signal Mode to select one of the PWM and PFM operation modes, that is, does not externally output the signal Mode. The inductance control terminal Lct1 that outputs the signal Mode is removed from the switching IC 44.

In the inductor device 64, the switching element 633 included in the inductor device 63 is replaced by a thermistor 643 with a positive temperature coefficient (that is, the higher the temperature, the larger the resistance value).

In the DC-DC converter 4, for example, the thermistor 643 may be electrically connected between the switching terminals Mb and Mc on the multilayer board 10a illustrated in FIG. 7 instead of the switching element 633.

With the DC-DC converter 4, the increase in temperature of the thermistor 643 due to heat generation is significantly reduced or prevented at a light load. As a result, the resistance value of the thermistor 643 decreases and the inductance value of the inductor device 64 becomes closer to a parallel inductance of the first coil 611 and the second coil 612.

When a load increases, the temperature of the thermistor 643 increases because of heat generation. As a result, the resistance value of the thermistor 643 increases and the inductance value of the inductor device 64 becomes closer to the single inductance of the first coil 611 larger than the above-described parallel inductance.

Thus, in the DC-DC converter 4, the inductance value of the inductor device 64 is autonomously controlled. A ripple in an output voltage is able to therefore be significantly reduced or prevented in the PFM operation at a light load and the PWM operation at a heavy load without the need for the control of an inductance value in the switching IC 44.

Modification of the Preferred Embodiments

Although DC-DC converter modules according to the preferred embodiments of the present invention have been described, the present invention is not limited to each preferred embodiment.

Various modifications to the preferred embodiments that are able to be conceived by those skilled in the art, and features provided by combining elements in different preferred embodiments without departing from the teachings of the present invention may be included in the scope of one or more aspects of the present invention.

For example, the feature in FIG. 6 of the switching element 633 being located outside the switching IC 43 and the step-up converter illustrated in FIG. 5 may be combined. That is, a step-up converter in which a switching element is located outside a switching IC is included in the present invention.

As examples of a DC-DC converter according to a preferred embodiment of the present invention, a step-down converter and a step-up converter have been described. However, the present invention is not limited to them. For example, the present invention is able to be applied to a step-up/down converter.

The present invention may be applied to a DC-DC converter that performs synchronous rectification by changing a diode in a switching circuit to a switching element.

Various dimension values, for example, the thickness and shape of each layer in a multilayer board and the position and size of a conductor are not restrictive in the present invention. Physical property values, for example, the components and component combination ratio of a ceramic material of each layer in a multilayer board and physical property values, for example, the components, component combination ratio, and electrical conductivity of a material of a conductor in a multilayer board are not also restrictive. These values are determined as appropriate in accordance with various desired electric characteristics, for example, the rated output and switching frequency of a DC-DC converter.

A DC-DC converter module according to the present invention is not limited to a module that is only a DC-DC converter, and may include other features or functions, for example, digital signal processing (DSP).

Preferred embodiments of the present invention are able to be widely applied to various electronic devices, for example, a personal digital assistant and a digital camera as an ultra-compact DC-DC converter module.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter that generates an adjusted output voltage from an input voltage and supplies the adjusted output voltage to a load, the DC-DC converter comprising:
   an inductor device including an inductance value that is switched between a first inductance and a second inductance larger than the first inductance in a case where the load includes a first load and a second load heavier than the first load, the inductor device including a first coil, a second coil, and a switching element with a conductive state and a non-conductive state that are controlled in accordance with the load; and
   a switching circuit electrically connected to the inductor device; wherein
   a circuit in which the second coil and the switching element are electrically connected in series and the first coil are electrically connected in parallel;
   the switching element is brought into conduction in a case where a predetermined light load condition is satisfied at the load;
   the switching circuit includes a controller that determines whether the predetermined light load condition is satisfied;
   the controller outputs a signal that controls a conductive state and a non-conductive state of a transistor included in the switching circuit;
   the switching circuit includes a diode; and
   the inductor device superimposes an output voltage generated by a counter-electromotive force on the input voltage via the diode in the non-conduction period of the transistor.

2. The DC-DC converter according to claim 1, wherein the switching circuit includes a switching IC; and the switching element is located in the switching IC.

3. The DC-DC converter according to claim 1, wherein the first coil and the second coil are provided in a multilayer board in which a plurality of substrate layers are laminated.

4. The DC-DC converter according to claim 1, wherein the switching circuit operates in one of a plurality of operation modes including a pulse width modulation mode and a pulse frequency modulation mode, selected in accordance with the load; and
   the switching element is brought into conduction in a case where the switching circuit operates in the pulse frequency modulation mode.

5. The DC-DC converter according to claim 1, further comprising:
   an input capacitor; and
   an output capacitor; wherein
   a first end of the input capacitor is electrically connected to the input voltage; and
   a first end of the output capacitor is electrically connected to the adjusted output voltage.

6. The DC-DC converter according to claim 5, wherein a second end of the input capacitor is electrically connected to a common ground terminal; and
   a second end of the output capacitor is electrically connected to the common ground terminal.

7. The DC-DC converter according to claim 1, wherein the switching circuit continuously applies the input voltage to the inductor device.

8. The DC-DC converter according to claim 1, wherein the switching element is a field-effect transistor.

9. The DC-DC converter according to claim 1, wherein the output voltage is lower than the input voltage.

* * * * *